United States Patent [19]

Goux

[11] 4,296,471
[45] Oct. 20, 1981

[54] DEVICE FOR INITIATING IN PARTICULAR THE IGNITION OF AN INTERNAL COMBUSTION ENGINE

[75] Inventor: Jacques Goux, Limours, France

[73] Assignees: Automobiles Peugeot; Societe Anonyme Automobiles Citroen, both of Paris, France

[21] Appl. No.: 45,770

[22] Filed: Jun. 5, 1979

[30] Foreign Application Priority Data

Jun. 8, 1978 [FR] France ............................... 78 17157

[51] Int. Cl.³ .............................................. F02P 5/04
[52] U.S. Cl. ..................... 364/424; 123/418; 235/92 FQ; 324/391; 364/565
[58] Field of Search ............... 364/424, 565; 324/378, 324/380, 381, 391; 73/116; 123/148 E, 416, 418; 235/92 FQ, 92 CC, 92 MT, 92 MP, 92 DE, 92 DP

[56] References Cited

U.S. PATENT DOCUMENTS

| | | | |
|---|---|---|---|
| 3,738,339 | 6/1973 | Huntzinger et al. | 123/148 E |
| 3,767,902 | 10/1973 | Estes et al. | 235/92 CC |
| 3,870,869 | 3/1975 | Eberle et al. | 235/92 FQ |
| 3,921,610 | 11/1975 | Hartig | 123/148 E |
| 3,996,911 | 12/1976 | Canup | 123/148 E |
| 4,086,894 | 5/1978 | Capurka | 123/148 E |
| 4,125,097 | 11/1978 | Gunderson | 123/148 E |
| 4,127,092 | 11/1978 | Fresow et al. | 123/148 E |
| 4,168,682 | 9/1979 | Gartner et al. | 123/148 E |
| 4,175,508 | 11/1979 | Wesenmeyer et al. | 123/148 E |
| 4,181,962 | 1/1980 | West, Jr. et al. | 364/565 |

Primary Examiner—Errol A. Krass
Attorney, Agent, or Firm—Burns, Doane, Swecker & Mathis

[57] ABSTRACT

A device is disclosed having means for measuring the speed of an engine, the means including a first sensor, a second sensor offset from the first sensor by an angle α, and a reference element that moves in front of the sensors. The reference element is mounted on a disc, and the disc is rigidly connected to a shaft of the engine. The speed measuring means further includes a first programmable divider down-counter whose input is connected to a clock which delivers thereto signals at a frequency fo and whose output is connected to a counter adapted to count the signals delivered by the divider. The frequency fc of said signals is equal to the frequency fo of the clock signals divided by the value of the angle β equal to the difference between 360° and the angle α of offset between the first and second sensors. The counter is connected to an address input of a memory containing different ignition advance angle values and having an output which is connected to a second programmable divider down-counter adapted to count down the signals stored at a frequency fd corresponding to a signal per angular unit of rotation of the engine, and, at the end of the count down, to produce a signal actuating the ignition initiating means.

5 Claims, 5 Drawing Figures

DEVICE FOR INITIATING IN PARTICULAR THE IGNITION OF AN INTERNAL COMBUSTION ENGINE

DESCRIPTION

The present invention relates to an electronic device for initiating a functional operation on a rotating machine. It is more particularly applicable to the initiation of the ignition of an internal combustion engine.

It is known that in an internal combustion engine having a controlled ignition, the spark of the spark-plug must be reproduced for a certain angular position of the crankshaft defined by an angle of advance relative to the top dead centre.

In order that the engine always operate under the best conditions, this angle must be constantly corrected in accordance with various operational parameters of the engine and in particular its speed of rotation.

All the known electronic ignition devices therefor comprise in particular means for measuring the speed of rotation of the engine and means for initiating the ignition as a function of the measured speed. These devices comprise one or two magnetic sensors placed in the vicinity of a disc provided, as the case may be, with one or more teeth or notches and rotating at the speed of the engine.

With the devices employing a single sensor, the speed is calculated in a continuous manner. These devices present the risk of being put out of order by a parasite effect on the circuits when the spark is produced, unless complex or costly antiparasite means are employed.

The devices employing two sensors enable these drawbacks to be avoided since the calculation of the speed can be effected in a fraction of the rotation of the crankshaft, the ignition being initiated in another fraction. Unfortunately, the drawback of these devices is that they depend on a precise angular positioning of the two sensors with respect to each other. Now, the environment of an engine is usually rather encumbered and it is not always possible to place the sensors in the desired position.

The main object of the invention is to overcome this drawback.

According to the invention, there is provided a device for initiating, in particular the ignition of an internal combustion engine, comprising means for measuring the speed of rotation of the engine which comprise a first sensor and a second sensor which are offset from each other by a predetermined angle and reference means which is movable between the sensors and mounted on a disc rigid with the shaft of the engine, and means for initiating the ignition as a function of the measured speed of rotation, wherein said means for measuring the speed of rotation further comprise a first programmable divider down-counter whose input is connected to a clock adapted to deliver thereto signals at a frequency fo and whose output is connected to a counter adapted to count the signals delivered by the programmable divider down-counter, the frequency fc of said signals being equal to the frequency fo of the clock signals divided by the value of the angle $\beta$ equal to the difference between 360° and the angle $\alpha$ of the offset between the first and second sensors, said counter being connected to an address input of a memory containing different values of ignition advance angles, the output of said memory being connected to a second programmable divider down-counter adapted to count down the stored signals at a frequency fd corresponding to one signal per angular unit of rotation of the engine, and, at the end of the count down, to produce a signal actuating said ignition initiating means.

Other features of the invention will be apparent from the ensuing description.

In the drawings, given solely by way of example:

Figure 1:
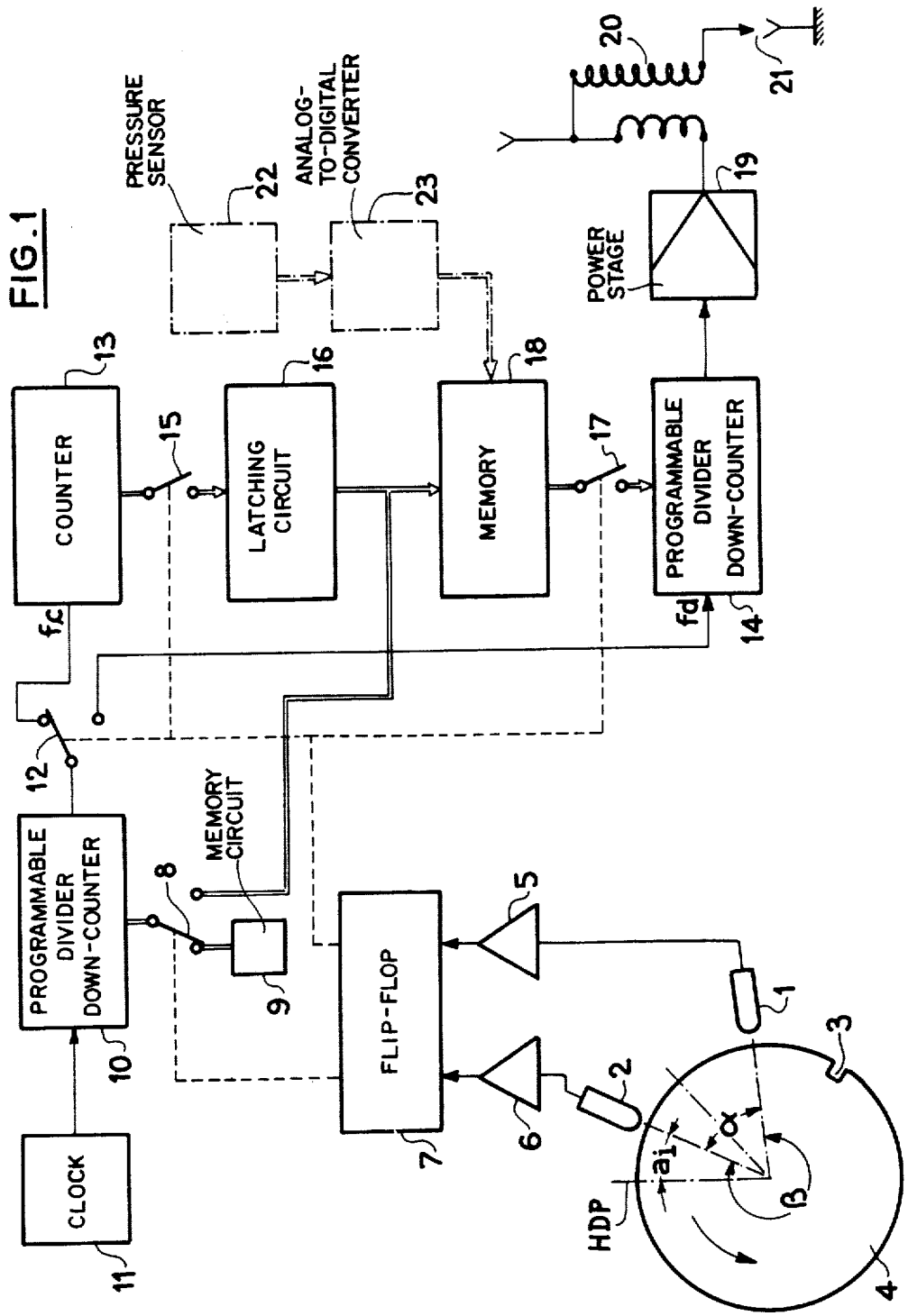
FIG. 1 is a diagram of the principle of the initiating device according to the invention.

The device illustrated diagrammatically in FIG. 1 comprises two sensors 1 and 2 adapted to detect the passage of reference element 3, for example constituted by a notch formed on the periphery of the flywheel 4 of an internal combustion engine (not shown). The sensor 2 and the reference element 3 are so positioned that the passage of the reference element in front of the sensor occurs for an angular position of the crankshaft corresponding to the minimum advance of the ignition ai. The sensor 1 is positioned $\alpha$ degrees in advance of the sensor 2, the value of the angle $\alpha$ being such that $\alpha$ exceeds the maximum desired extent or amplitude of the advance relative to the initial advance.

The sensors 1 and 2 are respectively connected to shaping amplifiers 5 and 6 whose outputs are each connected to an input of a flipflop circuit 7. The first output of the flipflop 7 is connected to a switch 8 adapted to connect a memory circuit 9 storing the value of the angle $\beta$ equal to the difference between 360° and the angle $\alpha$ between the sensors 1 and 2, to a first programmable divider down-counter 10 whose input is connected to the output of a clock circuit 11 and whose output is connected to a switch 12 which is connected on one hand to a counter 13 and on the other hand to a second programmable divider down-counter 14. The switch 12 is controlled by the second output of the flipflop 7 in the same way as a first contact 15 connecting the output of the counter 13 to the input of a latching circuit 16. A second contact 17, also controlled by the second output of the flipflop 7, is connected between the second programmable divider down-counter 14 and the output of a memory 18 whose input is connected to the output of the latching circuit 16. The latter is also connected to the first programmable divider down-counter 10 through a switch 8. It will be understood that the switches 8, 12 and the contacts 15, 17 may be controlled indifferently by either one of the outputs of the flipflop 7.

The output of the second programmable down-counter 14 is connected to the input of a power stage 19 supplying current to the ignition coil 20 of a spark-plug 21.

When it is desired to make the angle of advance depend on a couple of input values, for example the speed of rotation of the engine and the pressure in the induction pipe, there is added to the circuit just described a part shown in dot-dash lines and comprising a pressure sensor 22 and an analog-to-digital converter 23 connected to additional address inputs of the memory 18.

Figure 2:
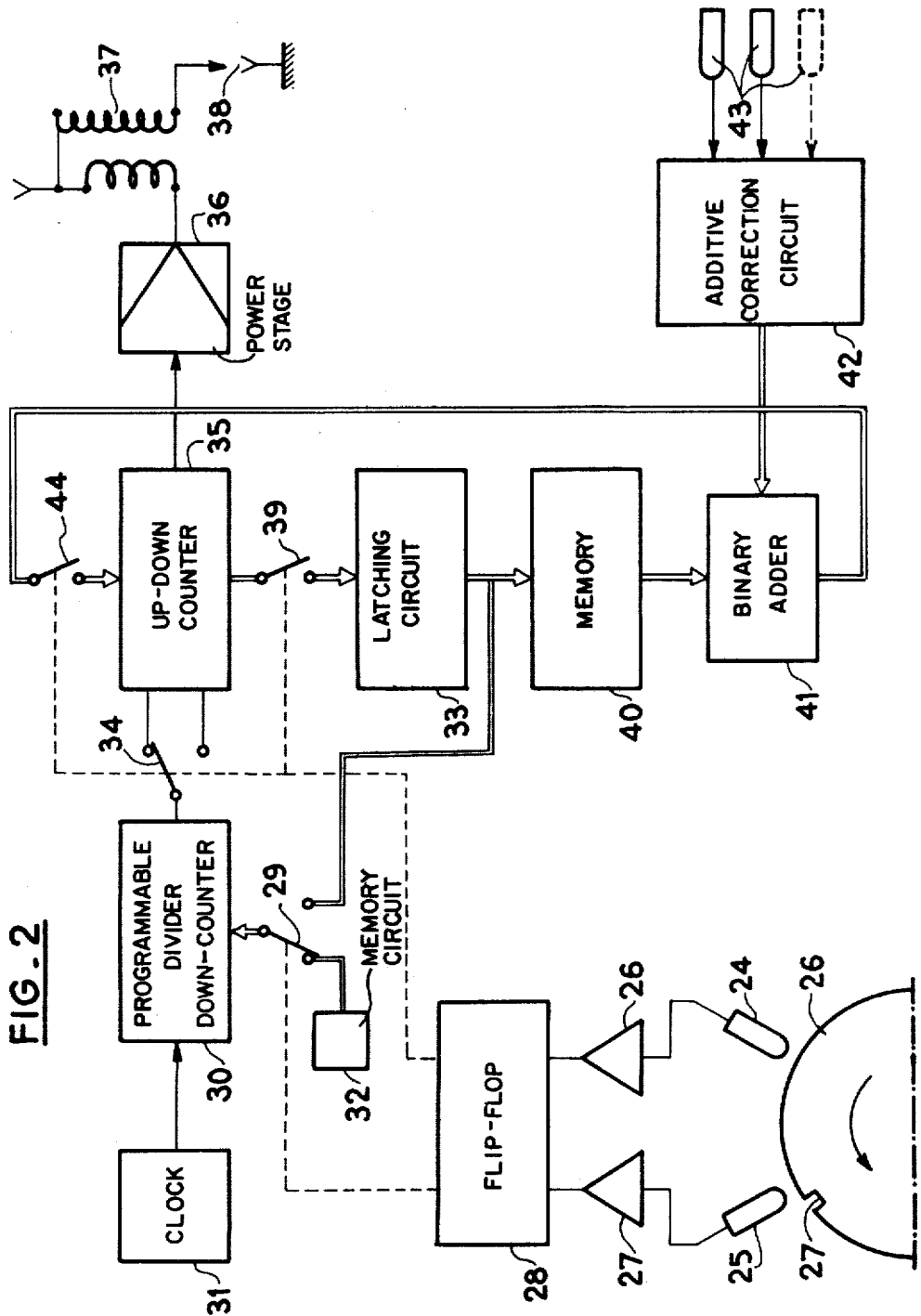
FIG. 2 is a diagram of the principle of a modification of the device of FIG. 1.

The device shown in FIG. 2 comprises in the same way as FIG. 1, two sensors 24 and 25 placed in the vicinity of a disc 26 provided with a notch 27. The positioning of the sensors 24 and 25 is similar to that of the sensors 1 and 2 of the device shown in FIG. 1. The outputs of the sensors 24 and 25 are connected through shaping circuits 26 and 27 to the inputs of a flipflop circuit 28 whose first output controls a switch 29. The latter is adapted to connect a programmable divider down-counter 30, which receives pulses from a clock 31, either to a memory circuit 32 storing the angle β equal to the difference between 360° and the angle between the two sensors 24 and 25, or to a latching circuit 33. The other output of the flipflop 28 controls a second switch 34 adapted to connect the programmable divider down-counter 30 to a first or to a second input of a prepositionable up-down-counter 35 whose output is connected to a power stage 36 supplying current to the ignition coil 37 of the spark-plug, such as 38, of an engine (not shown).

The up-down-counter 35 comprises an output connected to the latching circuit 33 through a contact 39 which is coupled to the switch 34. The output of the latching circuit 33 is connected to a memory 40 and to the programmable divider down-counter 30 through a switch 29. The output of the memory 40 is connected to a binary adder 41 whose other input is connected, through a circuit 42 effecting additive corrections, to sensors 43 such as pressure, temperature, sensors etc. The output of the binary adder is connected to a prepositioning input of the up-down-counter 35 through another contact 44 which is coupled with the switch 34.

As in the embodiment shown in FIG. 1, the switches 29, 34 and the contacts 39, 44 can be controlled indifferently by either one of the outputs of the flipflop 7.

The device described with reference to FIG. 2 enables the counting down and the counting up operations to be carried out by means of a single up-down-counter.

Figure 5:
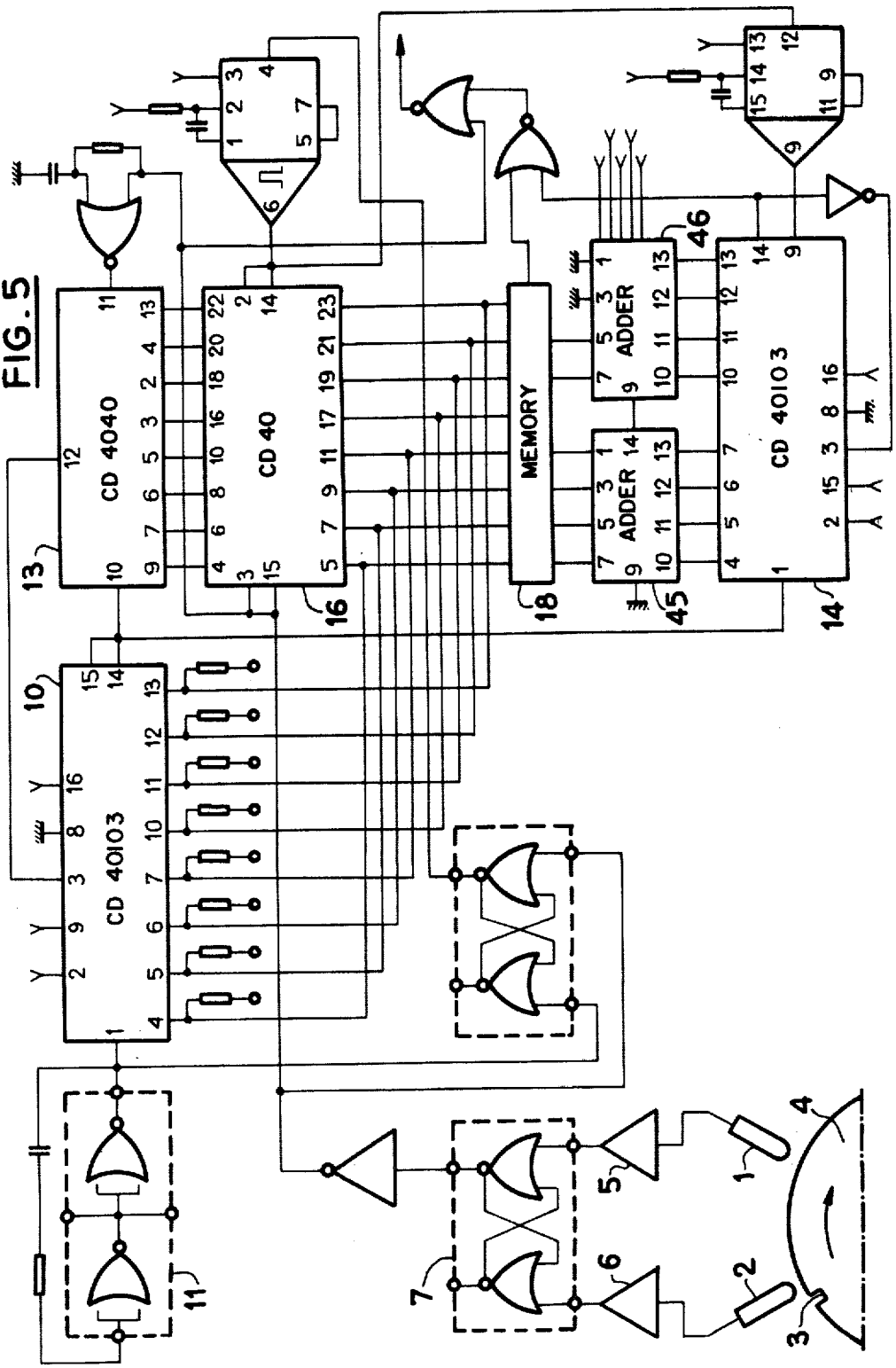
FIG. 5 is a diagram of the details of an embodiment of the device shown in FIG. 1.

FIG. 5 shows a detailed embodiment of the device of FIG. 1. The various necessary functions have been constructed by means of integrated digital circuits employed in CMOS technology, manufactured by the principal firms producing semiconductors, such as RCA, MOTOROLA, TEXAS INSTRUMENTS, SESCOSEM, etc.. The series chosen for the present embodiment is the series "4 000" of the firm RCA which presents the most complete range of functions, the main ones of which employed for the described application are:

| | |
|---|---|
| programmable divider down-counters 10 and 14 | CD 40103 |
| 12-bit binary counter 13 | CD 4040 |
| 8-bit latching circuit 16 | CD 40 |
| 4-bit up-down-counter 35, of the circuit of FIG. 2 | CD 4029 |

As can be observed, the device of FIG. 5 comprises other circuits which are not shown in FIG. 1. It concerns for example adders 45 and 46 interposed between the memory 18 and the programmable divider down-counter 14. In the embodiment, these two adders are 4-bit adders of the type CD 4008. The flipflop circuit 7 is a circuit of the type CD 4001, whereas the clock 11 is formed by one half of a circuit of the type 4001. The memory 18 is of conventional type employing any suitable technology, its capacity being usually 256 8-bit words.

Figure 3:
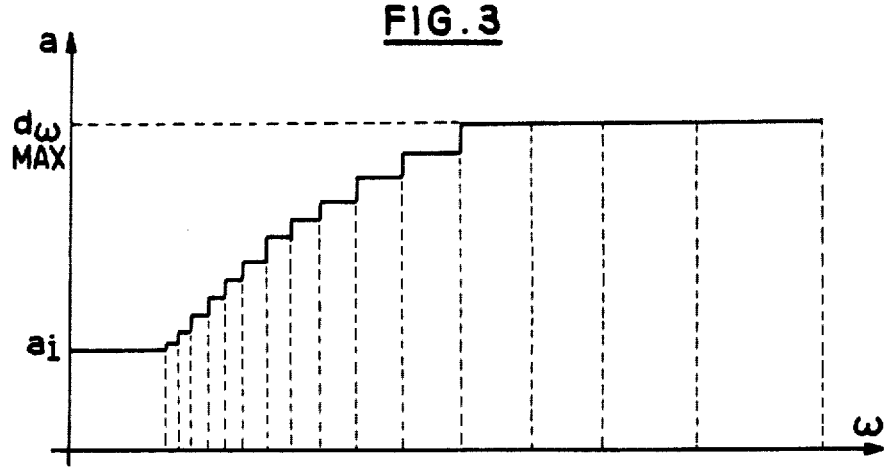
FIG. 3 is a diagram of the advance as a function of the angular speed.
Figure 4:
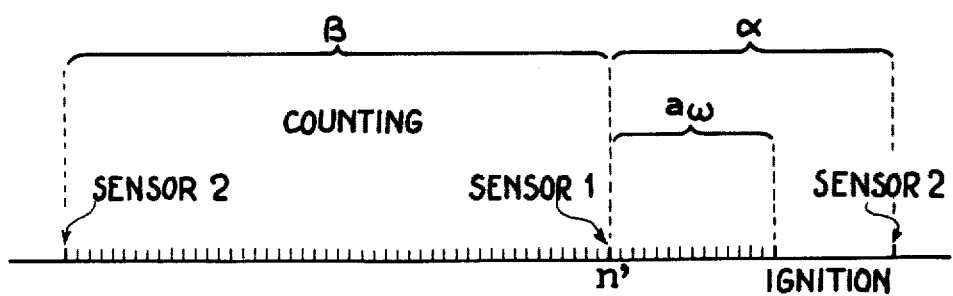
FIG. 4 is a diagram illustrating the operation of the device of the invention.

The operation of the device of FIG. 1 will now be described with reference to FIGS. 3 and 4. It concerns the measurement of the angular speed ω of the flywheel 4 of the engine by the counting of a frequency $f_c$ in the counter 13, when the reference element 3 travels through the the angle β, the value n found serving to address the memory 18 which contains the values of angles of advance corresponding to the different angular velocities by taking the sensor 1 as the origin of the angle. This value of angle $a_\omega$ is charged into the programmable divider down-counter 14 upon the passage of the reference in front of the sensor 1, the counting down occurring then with a counting-down frequency $f_d$ corresponding to one pulse per degree of rotation of the flywheel 4. The resetting of the down-counter 14 which will occur $a_\omega$ degrees after the sensor 1 is then detected. The ignition spark is produced by the conventional high tension circuit 19, 20.

This operation is carried out in the following manner.

The output signals of the sensors 1 and 2 are shaped by the stages 5 and 6 and each controls an input of the flipflop 7 whose state is a function of the position of the reference element 3 relative to the sensors 1 and 2.

When the reference element travels through the angle β after its passage in front of the sensor 2, the flipflop 7 controls the counting in the counter 13 of the pulses supplied thereto at frequency fp and which are obtained from the clock 11 which delivers pulses of frequency fo, these pulses travelling through the programmable divider down-counter 10 programmed by the flipflop 7 for dividing the frequency of the pulses by the value of the angle β stored in the circuit 9 during the counting stage. There is therefore obtained $f_c = fo/\beta$.

When the reference element 3 has travelled through the angle β, the end of the counting is detected by the sensor 1 and the flipflop 7 changes state.

At this moment, the counter 13 will have received a number of pulses $n = fc \times t$, t being the time required for the reference element 3 to travel through the angle ⊕. The time is related to the angular velocity by the relation $t = \beta/\omega$ which gives $n = fo/\beta \times \beta/\omega = fo/\omega$.

The change in the state of the flipflop 7 has for consequence:

to store the value n in the latching circuit 16;

to program the divider 10 so that it ensures a division by n;

to charge the programmable divider down-counter 14 at a value $a_\omega$ which represents the angle of advance stored in the memory 18 at the address n, n being representative of an angular velocity;

to initiate the down counting in the down-counter programmable divider 14, starting with this value $a_\omega$ and with a frequency $f_d$ produced by the programmable divider 10 and the clock 11, this frequency being such that $f_d = fo/n$. As moreover $n = fo/\omega$, there is obtained $f_d = \omega$.

As the frequency is expressed in pulses per second and the velocity ω in degrees per second, it can be seen that each pulse delivered at frequency $f_d$ corresponds to a rotation through 1° so that the down-counter programmable divider 14 reaches zero when the reference has travelled through $a_\omega$° after the passage in front of the sensor 1.

The down-counter programmable divider 14 produces a signal when it reaches the value zero. This signal, through the power stage 19 and the coil 20, produces a spark on the spark plug 21.

This ignition spark is produced for a position of the reference 3 located between the sensors 1 and 2 within the angle α. Upon the passage of the reference element 3 in front of the sensor 2, the flipflop 7 resumes its initial position and initiates a new counting cycle.

The device which has just been described has the following features:

For measuring the angular velocity ω, the system employs between the clock 11 delivering the frequency fo and the counter 13 which totalizes up to the number n, a down-counter programmable divider 10 whose factor of division is chosen to be equal to the value of the angle β expressed in degrees during which this measurement is effected.

This permits adapting the system to any construction independently of the angle β which has been chosen or is imposed with no modification of the structure, by still giving the same value to n for the same velocity ω irrespective of the motor employed and the position of the sensors on the latter.

During the counting down stage at the end of which the return to zero of the down-counter 14 must produce the ignition spark, there is employed the same clock 11 and the same down-counter programmable divider circuit 10 but whose division factor is chosen equal to the value n measured during the preceding counting stage which permits having at the output of the down-counter programmable divider 10, a down counting frequency fd so that each pulse corresponds to one degree of rotation of the flywheel of the motor irrespective of the angular velocity and the position of the sensors on the latter. This permits directly storing in the memory 18 values of advance expressed in degrees.

As the up counting and down counting stages are successive without overlapping, it is easy to replace the counter 13 and the down-counter 14 by a single counter down-counter circuit for the purpose of simplifying the construction. Such a replacement is ensured in the device shown diagrammatically in FIG. 2.

The storage in the memory of values of angle in degrees facilitates the correction of advance which is a function of the angular velocity thus produced by one or more exterior parameters:

the corrections by the addition or subtraction are easily obtained by interposing between the memory 18 and the down-counter 14 one or more digital adding circuits which receive correcting data from the corresponding sensors. Such an arrangement is shown in FIG. 5, which shows the adders 45 and 46 interposed between the memory 18 and the down-counter 18;

the corrections of tridimensional type, that is to say when each value of angle of advance depends on a couple of input values (for example velocity-pressure) are obtained by employing a memory having additional address inputs, or a programmable logic network having a large number of inputs. Such an arrangement is shown by the part in dot-dash lines of the diagram of FIG. 1.

The calculation of the velocity ω by the counting of the clock pulses gives a number n which is inversely proportional to ω. This number is therefore the larger as the angular velocity is smaller, which permits a close definition of the advance for very small variations in velocity at low engine speeds in respect of which the angle changes rapidly and a more and more broad definition toward the higher speeds where the angle becomes progressively constant. This phenomenon may be easily observed on the curve of FIG. 3, which represents the variation of the advance as a function of the angular velocity ω.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

Having now described my invention what I claim as new and desire to secure by Letters Patent is:

1. Device for initiating, in particular the ignition of an internal combustion engine, said device comprising means for measuring the speed of rotation of the engine which comprise a disc for fixing to the shaft of the engine, a first sensor and a second sensor associated with the disc and offset from each other by a predetermined angle, a reference element carried by the disc and movable in front of the sensors, and means for initiating the ignition as a function of the measured speed of rotation, said means for measuring the speed of rotation further comprising a first programmable divider down-counter having an output and an input, a clock connected to said input for delivering thereto signals at a frequency $f_o$, a first counting means connected to said output for counting the signals delivered by the programmable divider down-counter, the frequency $f_c$ of said signals delivered by the first programmable divider down-counter being equal to the frequency fo of the clock signals divided by the value of the angle β equal to the difference between 360° and the angle α of the offset between the first sensor and the second sensor, a first memory containing different values of ignition advance angles having an output and an address input, the first counting means being connected to said address input, a second programmable divider down-counting means connected to said output of the first memory for counting down the signals stored in the first memory at a frequency corresponding to one signal per angular unit of rotation of the disc and, at the end of the count down, producing a signal actuating said ignition initiating means.

2. Device as claimed in claim 1, comprising a flip-flop circuit connected to control said first programmable divider down-counter and second programmable divider down-counting means and having an output and an input to which input the first sensor and the second sensor are each connected, a first switch connected for switching the first programmable divider down-counter between a second memory circuit for storing the value β of the angle equal to the difference between 360° and the angle of offset between the first sensor and the second sensor and the address input of said first memory being coupled with said output of the flip-flop circuit, a second switch connected for switching the output of the first programmable divider down-counter between the first counting means and the second programmable divider down-counting means also being coupled with an output of the flip-flop circuit.

3. Device as claimed in claim 2, comprising a latching circuit connected between the first counting means and the first memory, a contact coupled to an output of the flip-flop circuit being connected between said first counting means and the latching circuit.

4. Device as claimed in claim 1, 2 or 3, further comprising a pressure sensor and an analog-to-digital converter connected to additional address inputs of the first memory.

5. Device as claimed in claim 1, wherein said second programmable divider down-counting means and said first counting means further comprise:
an up-down-counter having count up and count down inputs which are connected to the output of the first programmable divider down-counter through said second switch, said up-down-counter having a count up output connected to said first memory through a latching circuit and an additional input controlling the count down connected to an output of said first memory.

* * * * *